United States Patent [19]

Miyama et al.

[11] Patent Number: 5,763,011
[45] Date of Patent: Jun. 9, 1998

[54] FUNCTIONAL COATING FOR REDUCING FRICTION

[75] Inventors: Masayoshi Miyama; Naoaki Hoshino, both of Chiba, Japan

[73] Assignee: Kinugawa Rubber Ind. Co., Ltd., Chiba, Japan

[21] Appl. No.: 718,881

[22] Filed: Jan. 23, 1996

Related U.S. Application Data

[63] Continuation of Ser. No. 348,217, Nov. 28, 1994, abandoned.

[30] Foreign Application Priority Data

Nov. 26, 1993 [JP] Japan ......................... 5-295870

[51] Int. Cl.$^6$ ............................. B05D 3/00; B32B 27/00
[52] U.S. Cl. ........................ 427/393.5; 427/385.5; 264/129; 264/130; 523/149; 524/507; 524/538
[58] Field of Search .................... 524/507, 463, 524/538; 523/149, 22; 264/130; 427/385.8

[56] References Cited

U.S. PATENT DOCUMENTS

| | | | |
|---|---|---|---|
| Re. 32,757 | 9/1988 | Yamazaki et al. | 524/507 |
| 3,772,236 | 11/1973 | Soons | 260/29.6 F |
| 4,631,206 | 12/1986 | Mabuchi et al. | 427/340 |
| 4,720,518 | 1/1988 | Chihara et al. | 524/538 |
| 4,945,123 | 7/1990 | Miyama et al. | 524/507 |
| 5,115,007 | 5/1992 | Chihara et al. | 524/267 |
| 5,326,592 | 7/1994 | Goewey et al. | 427/256 |
| 5,343,655 | 9/1994 | Miyakawa et al. | 49/441 |
| 5,376,454 | 12/1994 | Sugasawa et al. | 428/421 |
| 5,476,626 | 12/1995 | Miyama et al. | 264/129 |

FOREIGN PATENT DOCUMENTS

| | | |
|---|---|---|
| 0 144 902 | 6/1985 | European Pat. Off. . |
| 0 514 047 | 11/1992 | European Pat. Off. . |
| 16 44 711 | 1/1971 | Germany . |
| 35 27 261 | 2/1986 | Germany . |
| 42 02 475 | 7/1992 | Germany . |
| 57-170314 | 10/1982 | Japan . |
| 1-133711 | 5/1989 | Japan . |
| 1-24643 | 5/1989 | Japan . |
| 3-161329 | 7/1991 | Japan . |

*Primary Examiner*—Tae Yoon
*Attorney, Agent, or Firm*—Foley & Lardner

[57] ABSTRACT

A urethane-resin based coating for reducing friction includes a urethane paint and a first powder. The coating is to be applied to a shaped article which is to be subjected to a heat treatment at a certain temperature after the application of the coating to the shaped article. The first powder has a melting point lower than the certain temperature and a solubility parameter which is smaller than or larger than that of the urethane paint by at least 0.5. The coating optionally further includes a second powder which has a melting point higher than the certain temperature. The coating provides the shaped article with low friction, irrespective of the coating film's thickness.

7 Claims, 2 Drawing Sheets ical coating for reducing friction, and more particularly to a urethane-resin based functional coating which is to be applied to glass sliding portions of a weatherstrip such as a glass run of an automobile, for reducing friction between an automotive window glass and the glass sliding portions of the weatherstrip.

FUNCTIONAL COATING FOR REDUCING FRICTION

This application is a continuation of application Ser. No. 08/348,217, filed Nov. 28, 1994 now abandoned.

BACKGROUND OF THE INVENTION

1. Field of the Invention

The present invention relates to a functional coating for reducing friction, and more particularly to a urethane-resin based functional coating which is to be applied to glass sliding portions of a weatherstrip such as a glass run of an automobile, for reducing friction between an automotive window glass and the glass sliding portions of the weatherstrip.

2. Description of the Prior Art

Hitherto, there have been various proposals to coat glass sliding portions of a glass run of an automobile with coatings for the purpose of reducing friction between an automotive window glass and the glass sliding portions of the glass run. A glass run is usually made of rubber so that the glass run is vulcanized for improving its characteristics.

For example, JP-A-1-133711 discloses a mouthpiece structure of an extruder of glass run, whereby glass sliding portions of the extruded glass run are coated with a coating liquid, immediately after the extrusion of glass run.

U.S. Pat. No. 5,326,592 corresponding to JP-A-5-131519 also discloses a process and apparatus for coating selected surface areas of extruded substrates with decorative or functional coatings, immediately after the extrusion. The functional coatings of this publication may include various polymers such as polyurethanes for high abrasion resistance, polyesters for weatherability, and silicones and TEFLON (a trade name) polymers for low friction resistance.

JP-A-3-161329 discloses a method of coating glass sliding portions of an extruded glass run with a solvent-free urethane coating, immediately after the extrusion. For reducing friction, this urethane coating may contain a liquid-type agent such as a silicone oil (dimethyl polysiloxane) or a solid-type agent such as TEFLON resin powder, molybdenum disulfide, boron nitride, tungsten disulfide or fluorinated graphite. The extrudates which have been coated with coatings by the methods of all the above publications are vulcanized later.

JP-A-57-170314 discloses a glass run having glass sliding portions on which fine particles (diameter: 5–500 µm) are adhered for reducing friction.

JP-B-1-24643 discloses a coating to be applied to glass sliding portions of a glass run. This coating may be a solvent thinned two-package type urethane-resin coating and contains first large-diameter particles (diameter: 10–30 µm) such as particles of talc and second small-diameter particles (diameter: 2–10 µm) such as particles of tetrafluoroethylene (the most preferable example), molybdenum disulfide, tungsten or nylon. The second small-diameter particles surround each first large-diameter particle and adsorb thereto. Thus, third large-diameter particles each having one first large-diameter particle surrounded by the second small-diameter particles are formed, as illustrated in this publication.

As is disclosed in JP-B-1-24643, when a solvent-thinned urethane-resin coating containing fine particles is applied to glass sliding portions of a glass run by spraying, the average thickness of a coating film will be about 20 µm and it is difficult to substantially increase the coating film thickness. Furthermore, the film thickness tends to become uneven if spraying is taken. Thus, in case that the film thickness is less than the diameter of the fine particles (for example, the third large-diameter particles disclosed in JP-B-1-24643), part of the fine particles will be exposed. With this, the film surface becomes minutely rough, and thus friction between a window glass and the glass run is efficiently reduced. However, in case that the film thickness is greater than the diameter of the fine particles, the fine particles are less exposed or not exposed at all. With this, the film surface becomes relatively flat, and thus the friction is not efficiently reduced. When the fine particles of the film are partly exposed and partly not exposed on a glass run, this deteriorates the external appearance of the glass run, too. Furthermore, as the density of the fine particles exposed on a glass run increases, the sliding noise of the window glass increases. Irrespective of coating method, it is unavoidable to have certain variations in thickness of the coating film. Therefore, it is considered to substantially increase the diameter of the fine particles or substantially increase the fine particle content of the coating so as to expose the fine particles above the coating film surface and to reduce the friction. However, if the diameter of the fine particles is increased too much, the orifice of an extruder tends to be clogged with the fine particles. Furthermore, if the fine particle content of the coating is increased too much, viscosity of the coating tends to become too high, thereby impeding the coating process.

SUMMARY OF THE INVENTION

It is therefore an object of the present invention to provide an improved functional coating for reducing friction, which is free of the above-mentioned drawbacks.

It is a more specific object of the present invention to provide an improved functional coating which can always reduce friction between a glass run and an automotive window glass, irrespective of the coating film thickness.

According to a first aspect of the present invention, there is provided a urethane-resin based coating for reducing friction, the coating being to be applied to a shaped article which is to be subjected to a heat treatment at a certain temperature after the application of the coating to the shaped article, the coating comprising:

a urethane paint; and a first powder having a melting point lower than said certain temperature and a solubility parameter which is smaller than or larger than that of said urethane paint by at least 0.5.

According to a second aspect of the present invention, there is provided a urethane-resin based coating for reducing friction, the coating being to be applied to a shaped article which is to be subjected to a heat treatment at a certain temperature after the application of the coating thereto, the coating comprising:

a urethane paint;

a first powder having a melting point lower than said certain temperature and a solubility parameter which is smaller than or larger than that of said urethane paint by at least 0.5; and a second powder which has a melting point higher than said certain temperature.

DETAILED DESCRIPTION OF THE INVENTION

A functional coating for reducing friction according to the present invention will be described in the following. A coating according to the present invention is a urethane-resin based coating which is to be applied, for example, to glass sliding portions of a weatherstrip such as a glass run of an automobile, for reducing friction between an automotive window glass and the glass sliding portions. However, it is needless to say that a coating according to the present invention may be used for other various purposes, too.

As will be clarified hereinafter, according to the first aspect of the present invention, a specific first powder is added to a urethane paint for reducing friction. This urethane paint comprises a mixture of a polyol as a main reagent, an isocyanate as a hardener and a pigment such as carbon black. Furthermore, according to the second aspect of the present invention, a specific second powder together with the first powder is added to the urethane paint for reducing friction.

Figure 1:
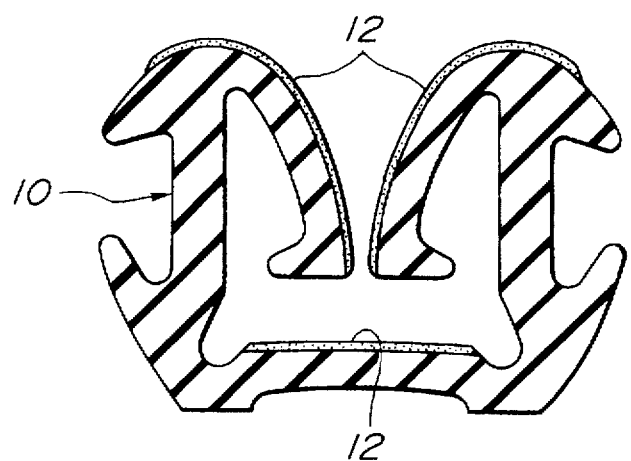
FIG. 1 is a sectional view showing a glass run having glass sliding portions to which a coating according to the present invention has been applied.

With reference to FIG. 1, a process for preparing a glass run 10 according to the present invention will be briefly described in the following. At first, a glass run 10 is shaped, for example, by extrusion with an extruder. Then, a coating according to the present invention is applied to glass sliding portions of the shaped glass run 10. Finally, the coated glass run 10 is subjected to a heat treatment. In fact, this heat treatment is vulcanization in case that the glass run is made of rubber. In the invention, the coating is applied to glass sliding portions of a shaped (extruded) glass run by spraying, roller coating or the like so as to form a coating film 12 on the glass run. However, as is disclosed in U.S. Pat. No. 5,326,592, it is preferable that the coating is applied to the glass run, immediately after the extrusion, at the location adjacent to the orifice of the extruder, for the purpose of increasing the coating film thickness and the productivity of glass run. If this method is taken, it is preferable to use a solvent-free urethane paint. This paint does not contain a solvent for reducing its viscosity. However, this paint may contain a very small amount of solvent contained in, for example, an agent for dispersing the polyol and the powder or an agent for increasing compatibility between the urethane paint and a silicone oil added to the urethane paint.

According to the first aspect of the present invention, the specific first powder is added to the urethane paint for the purpose of reducing friction. It is necessary that the first powder has a melting point which is lower than the temperature of heating treatment of the glass run. In case that the glass run is made of rubber, the first powder has a melting point which is lower than the vulcanization temperature of rubber which is about 200° C.

Furthermore, difference in solubility parameter (SP) between the first powder and the urethane paint must be at least 0.5. In other words, it is necessary that the first powder has SP which is smaller than or larger than that of the urethane paint by at least 0.5. SP is cohesive energy density, i.e. represented by the following equation:

$$SP=(\Delta E/V)^{1/2}$$

wherein $\Delta E$ is molar vaporization energy (cal/mole) and V is molar volume (ml/mole).

It is noted that SP is a useful index of compatibility. In general, compatibility of two or more substances is more improved as the difference in SP therebetween becomes smaller. Thus, according to the present invention, compatibility of the first powder and the urethane paint is inferior by at least a certain degree. The urethane paint has SP (for example, 10) which is larger than that of rubber. In fact, rubber has SP ranging from 8.0 to 8.5. Thus, in case that the first powder has SP which is smaller than that of the urethane paint by at least 0.5 and which is closer to SP of rubber than to SP of the urethane paint, the first powder tends to move to the boundary between the glass run and the coating film. This phenomenon is not so desirable in the present invention. Thus, it is preferable that the first powder has SP which is larger than that of the urethane paint by at least 0.5.

As is shown in Table 1, examples of the first powder are 12-nylon, 11-nylon and the like. These examples have melting points lower than 200° C. (vulcanization temperature of rubber). It should be noted that the results of Table 1 are published known values concerning pure materials. Thus, for example, the aftermentioned commercial 12-nylon used in Example 1 is somewhat different from 12-nylon (pure material) shown in Table 1 with respect to melting point. The average diameter of the first powder is in a range from 5 to 500 μm. Its average diameter is preferably in a range from 20 to 100 μm.

In the invention, the first powder is added to the urethane paint such that the weight ratio of the first powder to the polyol of the urethane paint is in a ratio from 5:100 to 50:100. If it is less than 5:100, it is difficult to get a satisfactory friction reduction. If it is greater than 50:100, it is difficult to apply the coating smoothly. With this, the coating film tends to have cracking.

Figure 2:
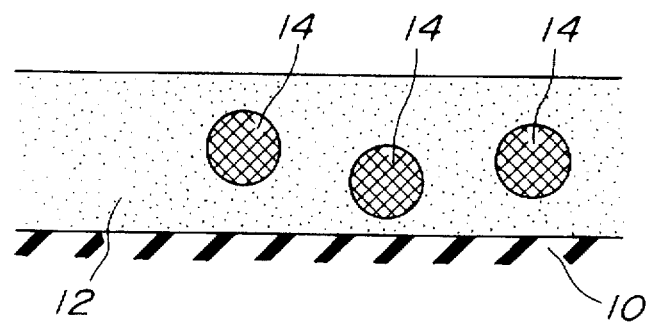
FIGS. 2 and 3 are sequential schematic sections showing respectively a coating film condition immediately after the application of a coating according to a first aspect of the present invention and that after vulcanization of the glass run.
Figure 3:
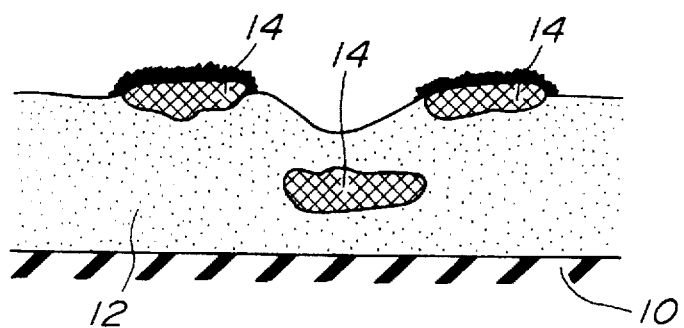

According to the first aspect of the present invention, distribution of particles of the first powder in the coating film, immediately after the application of the coating, is schematically shown in FIG. 2. Designated by numeral 14 is each particle of the first powder. After the application of the coating, the coated glass run 10 is subjected to a heat treatment (vulcanization). When the coated glass run 10 is heated for vulcanizing the same, the first powder particles 14 melt and thus increase in fluidity. As is shown in FIG. 3, the thus melted particles 14 tend to rise to the surface of the coating film 12 because the first powder is different from the urethane paint in SP by at least 0.5, as mentioned hereinabove. Then, the melted particles 14 of the first powder contract and solidify as the coated glass run cools down. As is shown in FIG. 3, the coating film's surface becomes minutely rough due to the difference of degree of contraction between the first powder and the urethane paint. The coating film's surface more efficiently becomes minutely rough as the first powder particles are positioned closer to the coating film's surface. However, it should be noted that the coating film's surface becomes minutely rough due to the contraction of the first powder particles 14 even if the first powder particles 14 are not positioned close to the coating film's surface. It is preferable that the first powder is smaller than the urethane paint in specific gravity for the purpose of making the first powder particles 14 positioned closer to the coating film's surface. However, even if the first powder is the same as or larger than the urethane paint in specific gravity, the coating film's surface becomes minutely rough due to the contraction of the first powder particles 14. The minutely rough surface of the coating film 12 contributes to the friction reduction. According to the present invention, even if the thickness of the coating film becomes greater than the diameter of the first powder's particles 14 as is shown in FIG. 3, the coating film's surface becomes minutely rough as explained hereinabove. Thus, coefficient of friction becomes always satisfactory by a coating according to the present invention. In other words, the friction can be satisfactorily reduced by the coating, irrespective of the coating film thickness.

In case that a coating is applied to an extruded glass run immediately after the extrusion, the coating film tends to become thick in thickness. Therefore, a coating according to the present invention is very useful in this case.

According to the present invention, the coating film's surface becomes entirely minutely rough. Therefore, the external appearance of the coating film is much improved. Furthermore, the sliding noise caused by the movement of the window glass on the glass run is substantially reduced, irrespective to the coating film thickness.

According to the second aspect of the present invention, in addition to the first powder, a second powder is added to the urethane paint for the purpose of reducing friction. It is necessary that the second powder has a melting point which is higher than the temperature of heating treatment of the glass run. In other words, the second powder has a melting point which is higher than the vulcanization temperature (about 200° C.) of the glass run in case that the glass run is made of rubber.

As is shown in Table 1, examples of the second powder are 6-nylon, 6,6-nylon, polytetrafluoroethylene (PTFE), a polycarbonate and the like. The average diameter of the second powder is in the same range as that of the first powder. The first and second powders are added to the urethane paint such that the weight ratio of each of the first and second powders to the polyol of the urethane paint is in a ratio from 5:100 to 50:100. If it is less than 5:100, it is difficult to get a satisfactory friction reduction. If it is greater than 50:100, it is difficult to apply the coating smoothly. With this, the coating film tends to have cracking.

Figure 4:
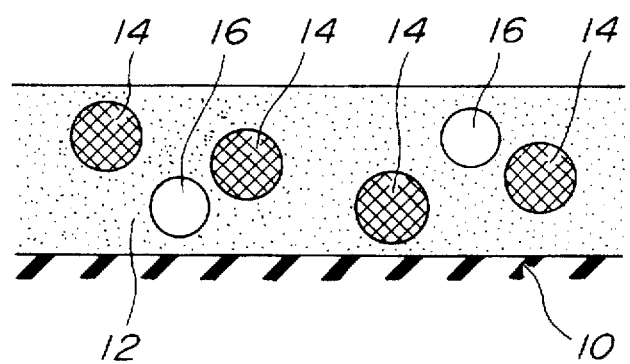
FIGS. 4 and 5 are views which are respectively similar to FIGS. 2 and 3, but are in accordance with a second aspect of the present invention.
Figure 5:
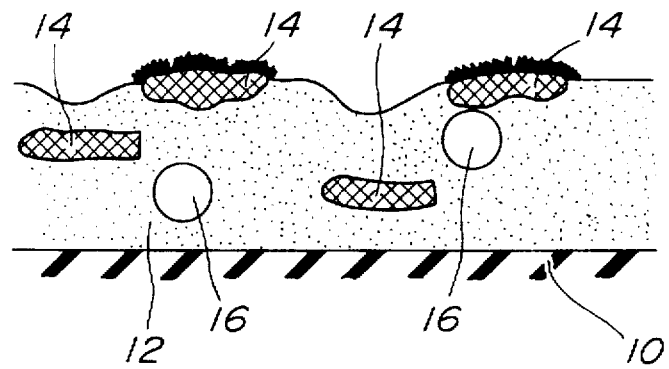

According to the second aspect of the present invention, distribution of particles 14, 16 of the first and second powders in the coating film 12, immediately after the application of the coating, is schematically shown in FIG. 4. After the application, the coated glass run 10 is subjected to a heat treatment. When the coated glass run is heated for vulcanizing the same, particles 14 of the first powder melt and thus increase in fluidity. The thus melted particles 14 tend to rise to the surface of the coating film 12 (see FIG. 5). Then, the melted particles 14 contract and solidify as the coated glass run 10 cools down. As is shown in FIG. 5, the coating film's surface becomes minutely rough due to the difference of degree of contraction between the first powder and the urethane paint. In contrast, the particles 16 of the second powder does not melt at the vulcanization temperature (about 200° C.). Therefore, relative positions of the second powder's particles 16 after the vulcanization are substantially the same as those immediately after the application of the coating. As the first powder's particles 14 positioned on the coating film's surface are abraded, the second powder's particles 16 gradually become exposed on the coating film's surface. Thus, the coating film's surface still become minutely rough. Therefore, according to the second aspect of the present invention, the advantage of friction reduction will last for a longer time. It is needless to say that the coating film according to the second aspect has the abovementioned advantages of the coating film according to the first aspect, too.

TABLE 1

|  | m.p. (°C.) | sp. gr. | SP |
|---|---|---|---|
| Polymers (m.p. lower than 200° C.) | | | |
| 11-nylon | 186 | 1.04 | 11.3 |
| 12-nylon | 175 | 1.03 | 11.2 |
| polymethyl methacrylate | 180 | 1.17 | 9.3 |
| polyethylene | 136 | 0.95 | 7.9 |
| polypropylene | 168 | 0.90 | 8.0 |
| polystyrene | 190 | 1.05 | 9.1 |
| polyvinyl chloride | 180 | 1.25 | 9.5 |
| Polymers (m.p. higher than 200° C.) | | | |
| 6-nylon | 220 | 1.13 | 12.7 |
| 6,6-nylon | 255 | 1.14 | 13.6 |
| polytetrafluoroethylene | 327 | 2.17 | 6.2 |
| polycarbonate | 240 | 1.20 | 9.7 |
| epoxy resin | — | 1.12 | 10.9 |
| Urethane paint | — | 1.15 | 10 |

The present invention will be illustrated with the following nonlimitative examples.

EXAMPLE 1

A solvent-free urethane paint was prepared by mixing together 100 parts by weight of a polyol having a group having an ether bond and an ester bond (DESMOPHEN 1150 which is a trade name of Sumitomo Bayer Urethane Co., Ltd. was used as this polyol), 1 part by weight of carbon black (pigment), 20 parts by weight of a silicone oil (dimethyl polysiloxane) having a viscosity of 100,000 cps, 20 parts by weight of PTFE powder (RUBURON L-5 which is a trade name of Daikin Industries, Ltd.), 57 parts by weight of hexamethylene diisocyanate (HDI) prepolymer (SUMIDUR N3500 which is a trade name of Sumitomo Bayer Urethane Co., Ltd.). Then, 5 parts by weight of 12-nylon powder (SP500 which has a melting point of 160° C. and is a trade name of Toray Industries, Inc.) as the first powder was added to the urethane paint to prepare a coating. This coating was applied to glass sliding portions of a shaped glass run so as to form thereon a coating film having a thickness of 50 μm. Separately, this coating was also applied to another shaped glass run so as to form thereon another coating film having a thickness of 100 μm. Then, these coated glass runs were heated at a temperature of about 200° C. for vulcanizing the glass runs. Then, the vulcanized glass runs were allowed to cool down. Then, coefficient of kinetic friction for each coating film was determined by a known method using a glass plate.

EXAMPLE 2

In this example, Example 1 was repeated except that 10 parts by weight of the 12-nylon as the first powder was added to the solvent-free urethane paint of Example 1 for preparing a coating. The application of this coating was conducted in the same manner as in Example 1. After the vulcanization, coefficient of kinetic friction was determined by the same method as that of Example 1.

EXAMPLE 3

In this example, Example 1 was repeated except that 15 parts by weight of the 12-nylon as the first powder was added to the solvent-free urethane paint of Example 1 for preparing a coating. The application of this coating was conducted in the same manner as in Example 1. After the vulcanization, coefficient of kinetic friction was determined by the same method as that of Example 1.

By comparison between the results of Examples 1–3 shown in Table 2, it is understood that the difference between kinetic friction coefficient on the coating film having a thickness of 50 μm and kinetic friction coefficient on the coating film having a thickness of 100 μm became small by increasing the amount of the 12-nylon powder.

EXAMPLE 4

In this example, Example 1 was repeated except that 10 parts by weight of the 12-nylon powder (the first powder) and 5 parts by weight of 6-nylon powder (A1022 which has a melting point of 260° C. and is a trade name of Unitika Ltd.) as the second powder were added to the solvent-free urethane paint of Example 1 for preparing a coating. The application of this coating was conducted in the same manner as in Example 1. After the vulcanization, coefficient of kinetic friction was determined by the same method as that of Example 1.

EXAMPLE 5

In this example, Example 1 was repeated except that 5 parts by weight of the 12-nylon powder (the first powder) and 10 parts by weight of the 6-nylon powder (the second powder) were added to the solvent-free urethane paint of Example 1 for preparing a coating. The application of this coating was conducted in the same manner as in Example 1. After the vulcanization, coefficient of kinetic friction was determined by the same method as that of Example 1.

As shown in Table 2, it is understood that each kinetic friction coefficient on the coating film having a thickness of 50 μm according to Examples 4–5 was smaller than that on the coating film having a thickness of 50 μm according to Examples 1–3.

COMPARATIVE EXAMPLE 1

In this example, Example 1 was repeated except that the 12-nylon powder (the first powder) was omitted. In other words, the solvent-free urethane paint of Example 1 was used as a coating. The application of this coating was conducted in the same manner as in Example 1. After the vulcanization, coefficient of kinetic friction was determined by the same method as that of Example 1.

COMPARATIVE EXAMPLE 2

In this example, Example 1 was repeated except that the 12-nylon powder (the first powder) was omitted and 15 parts by weight of the 6-nylon powder (the second powder) was added to the solvent-free urethane paint of Example 1 for preparing a coating. The application of this coating was conducted in the same manner as in Example 1. After the vulcanization, coefficient of kinetic friction was determined by the same method as that of Example 1.

COMPARATIVE EXAMPLE 3

In this example, Example 1 was repeated except that the 12-nylon powder (the first powder) was omitted and 30 parts by weight of the 6-nylon powder (the second powder) was added to the solvent-free urethane paint of Example 1 for preparing a coating. The application of this coating was conducted in the same manner as in Example 1. After the vulcanization, coefficient of kinetic friction was determined by the same method as that of Example 1.

As shown in Table 2, it is understood that each kinetic friction coefficient on the coating film having a thickness of 50 μm or 100 μm according to Comparative Example 1 was much larger than that on the coating film having a thickness of 50 μm or 100 μm according to Examples 1–5. Each kinetic friction coefficient on the coating film having a thickness of 50 μm according to Comparative Examples 2–3 was as small as that according to Examples 1–5. However, it should be noted that each kinetic friction coefficient on the coating film having a thickness of 100 μm according to Comparative Examples 2–3 was larger than that according to Examples 1–5. Therefore, the differences between the two kinetic friction coefficients according to Comparative Examples 2–3 are much larger than those according to Examples 1–5.

TABLE 2

|  | Kinetic Friction Coef. (50 μm thick) | Kinetic Friction Coef. (100 μm thick) | Diff. between Two Coefs. |
| --- | --- | --- | --- |
| Example 1 | 0.23 | 0.28 | 0.05 |
| Example 2 | 0.21 | 0.25 | 0.04 |
| Example 3 | 0.19 | 0.21 | 0.02 |
| Example 4 | 0.17 | 0.22 | 0.05 |
| Example 5 | 0.16 | 0.24 | 0.08 |
| Com. Ex. 1 | 0.78 | 0.85 | 0.07 |
| Com. Ex. 2 | 0.15 | 0.42 | 0.27 |
| Com. Ex. 3 | 0.13 | 0.31 | 0.18 |

What is claimed is:

1. A urethane-resin based coating for reducing friction, the coating intended to be applied to a shaped article which is made of rubber and is to be subjected to a heat treatment at a temperature suitable for the vulcanization of said shaped article after the application of the coating thereto, the coating comprising:

a urethane paint;

a first powder having a melting point lower than said temperature suitable for the vulcanization and a solubility parameter which is larger than that of said urethane paint by at least 0.5, said first powder being made of at least one selected from the group consisting of 11-nylon, and 12-nylon; and a second powder which has a melting point higher than said temperature suitable for the vulcanization, said second powder being made of at least one selected from the group consisting of 6-nylon, 6,6-nylon, polycarbonate and an epoxy resin.

2. A coating according to claim 1, wherein said urethane paint comprises a polyol, an isocyanate and a pigment.

3. A coating according to claim 2, wherein the weight ratio of each of said first and second powders to said polyol is in a range from 5:100 to 50:100.

4. A urethane-resin based coating for reducing friction, the coating intended to be applied to a shaped article which is made of rubber and is to be subjected to a heat treatment at a temperature suitable for the vulcanization of said shaped article after the application of the coating to the shaped article, the coating comprising:

urethane paint; and a first powder having a melting point lower than said temperature suitable for the vulcanization and a solubility parameter which is larger than that of said urethane paint by at least 0.5, said first powder being made of at least one selected from the group consisting of 11-nylon, and 12-nylon, and a second powder which has a melting point higher than said temperature suitable for the vulcanization wherein the second powder comprises 6-nylon.

5. A coating according to claim 1, wherein the first powder comprises 12-nylon.

6. A coating according to claim 1, wherein the second powder comprises 6-nylon.

7. A method of applying a urethane-resin based coating to a shaped article made of rubber, comprising applying the coating to the article immediately after an extrusion to obtain the shaped article, at a location adjacent to an orifice of an extruder for the extrusion, and subjecting the shaped article to a heat treatment at a temperature suitable for the vulcanization of the shaped article, wherein the coating comprises a coating according to claim 1.

* * * * *